Figure 1:
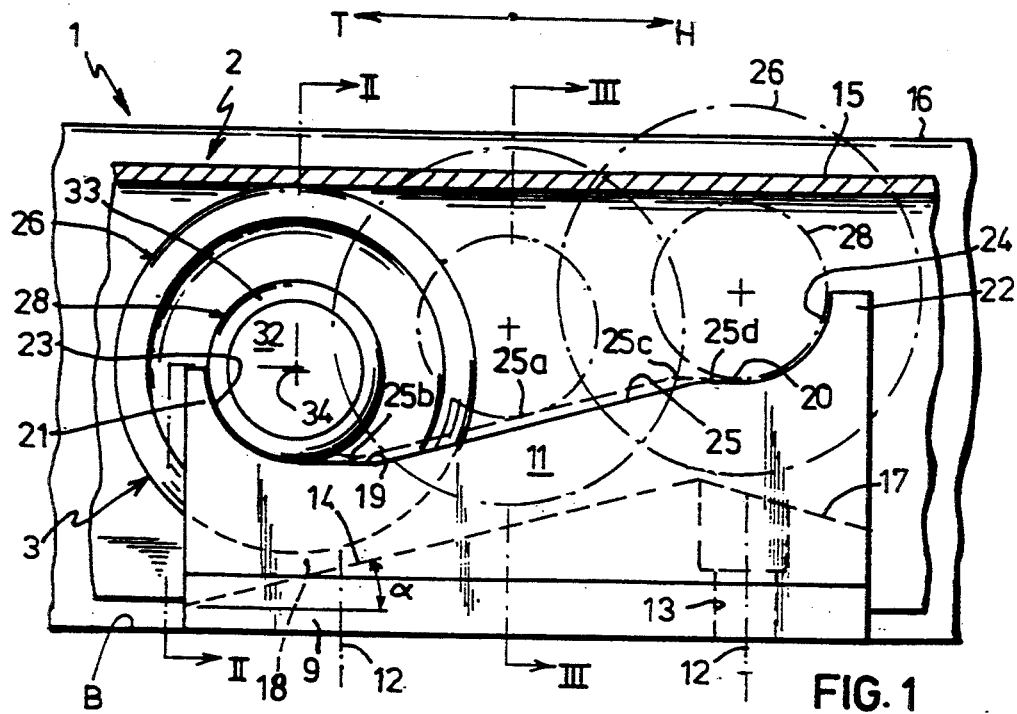

United States Patent [19]

De Vries

[11] Patent Number: 5,409,102

[45] Date of Patent: Apr. 25, 1995

[54] WALKING BEAM CONVEYOR

[75] Inventor: Hugo V. De Vries, Ermelo, Netherlands

[73] Assignee: Elten Systems B.V., Barneveld, Netherlands

[21] Appl. No.: 166,555

[22] Filed: Dec. 14, 1993

[30] Foreign Application Priority Data

Jan. 12, 1993 [NL] Netherlands .......... 9300055

[51] Int. Cl.6 .......................................... B65G 25/00
[52] U.S. Cl. ........................... 198/774.1; 198/774.1
[58] Field of Search ........................ 198/774.1, 774.4

[56] References Cited

U.S. PATENT DOCUMENTS

| 3,451,532 | 6/1969 | Manterfield | 198/774.4 |
| 3,767,064 | 10/1973 | Lutz | 214/1 |
| 4,009,774 | 3/1977 | Lutz | 198/773 |
| 4,466,792 | 8/1984 | Ballabene et al. | 198/774.4 X |
| 4,787,803 | 11/1988 | van Elten et al. | 414/581 |
| 4,793,472 | 12/1988 | Solund | 198/774.4 |
| 5,228,819 | 7/1993 | Hammond | 198/774.4 X |

FOREIGN PATENT DOCUMENTS

| 0035818 | 3/1987 | European Pat. Off. | |
| 2486187 | 1/1982 | France | |
| 0029044 | 8/1974 | Japan | 198/774.4 |
| 0044413 | 3/1985 | Japan | 198/774.4 |
| 1560752 | 2/1980 | United Kingdom | 198/774.4 |
| 1085904 | 4/1984 | U.S.S.R. | 198/774.4 |
| 1565790 | 5/1990 | U.S.S.R. | 198/774.4 |

*Primary Examiner*—H. Grant Skaggs
*Assistant Examiner*—Carol L. Druzbick
*Attorney, Agent, or Firm*—Brumbaugh, Graves, Donohue & Raymond

[57] ABSTRACT

A walking beam conveyor is described, comprising a static support for the objects to be conveyed, a back and forth drivable conveyor beam which may cooperate with a lifting and lowering device consisting of a plurality of separate mechanisms, and a support for the lifting and lowering mechanisms.

According to the invention each lifting and lowering mechanism (3) consists of a free rotatable roller (26), which is continuously in contact with the conveyor beam (2) having at least one support member (28), and of a roller support (9) which is provided with at least one inclined running surface (18) for the free rotatable roller and with at least one bearing surface (19, 20) for the support member at both ends of the inclined running surface.

10 Claims, 3 Drawing Sheets

WALKING BEAM CONVEYOR

The present invention relates to a walking beam conveyor, comprising a static support for the objects to be conveyed, a back and forth drivable conveyor beam which may cooperate with a lifting and lowering device consisting of a plurality of separate mechanisms, in such a way, that the conveyor beam is positioned above the upper surface of the static support during the forward stroke and is beneath said upper surface during the backward stroke, and a support base for the lifting and lowering mechanisms.

Such a walking beam conveyor is known from document EP-B-35818. This known walking beam conveyor consists of a conveyor beam, a profiled supporting channel, the bottom part of which being provided with two support surfaces in longitudinal direction for the objects to be conveyed, two V-shaped grooves and two support surfaces for the conveyor beam, the conveyor beam at the bottom side being provided with shafts mounted transversely to the conveying direction and onto which are mounted pivotable support segments which have a rim with a spiral-shaped inclined surface with stop surfaces and a sliding surface, the spiral-shaped inclined surface cooperating with the flanks of the V-shaped grooves, the stop surfaces cooperating with a bottom surface of the conveyor beam, and the sliding surface cooperating with the bottom of the V-shaped grooves and the cross-section of the rim being V-shaped, wherein the width within the reach of the spiral-shaped inclined surface is greater and within the reach of the sliding surface is smaller than the width of the bottom of the V-shaped grooves in the supporting channel.

During the forward stroke, the conveying stroke, of the conveyor beam the spiral-shaped inclined surface of the support segments is, owing to their own weight, pushed into the V-shaped grooves, so that the support segments are pivoted about their pivot shaft and the conveyor beam is lifted until the sliding surface rests on the bottom of the V-shaped grooves and the one stop surface lies against the bottom surface of the conveyor beam, wherein the upper surface of the conveyor beam is positioned above the upper surface of the support surfaces and the objects are conveyed over a certain distance. During the backward stroke of the conveyor beam the support segments with their spiral-shaped inclined surfaces first rotate again into the V-shaped grooves and the conveyor beam is lowered until the other stop surface rests against the bottom side of the conveyor beam and the conveyor beam lies onto the support surfaces. In this condition, the upper surface of the conveyor beam lies beneath the upper face of the support surfaces and the conveyor beam may carry out freely the backward stroke.

A great disadvantage of this known walking beam conveyor is that the conveyance of the objects is carried out by sliding, wherein the sliding surface of the support segments slides over the bottom of the V-shaped grooves in the supporting channel. Because of the friction occurring therewith, relatively great conveyance forces are necessary. A second disadvantage is that the support or swing segments, preferably made of a wear-resistant plastic material, soften due to the frictional heat on the sliding surface, so that the allowable load and the conveying frequency are limited. A third disadvantage is that the known walking beam conveyor makes a lot of noise by the sliding conveyances especially when it is mounted in large numbers in a room or installation, particularly in a storing device, such as the one described in document EP-B-35818.

A fourth disadvantage of the known walking beam conveyor is further that it is difficult to clean when leakage occurs from the conveyed objects, like for instance crates with dairy products.

The invention aims at removing the disadvantages of this known walking beam conveyor and to provide a walking beam conveyor with a simple and solid construction, and wherein only the conveyor beam needs to be driven.

This purpose is attained, in that each lifting and lowering mechanism comprises at least one free rotatable roller having at least one support member and which with a part of its outer surface is continuously in contact with a running surface extending in the conveying direction, and a roller support having at least one inclined running surface enclosing an acute angle with the support and which may cooperate with a part of the outer surface of the free rotatable roller, and at least one bearing surface for the support member at both ends of the inclined running surface, which bearing surfaces at their free ends are provided with a stop for the support member, one and another such that during the forward stroke of the conveyor beam at first only the support member contacts the one bearing surfacer wherein the free rotatable roller is free from the inclined running surface, then only the roller cooperates with the inclined running surface, wherein the support member is free from the bearing surfaces and finally only the support member cooperates with the other bearing surface, wherein the free rotatable roller is free from the inclined running surface, and in reverse order during the backward stroke.

By applying these measures it is attained that with the conveyance of the objects during the forward stroke and during the backward stroke of the conveyor beam substantially only a rolling friction occurs between the conveyor beam and each lifting and lowering mechanism, so that the driving forces on the conveyor beam may remain relatively small, generating frictional heat is avoided and the noise during the operation of the walking beam conveyor is reduced to a minimum.

With a preferred embodiment of the walking beam conveyor according to the invention each lifting and lowering mechanism is provided with two support rollers at both sides of the free rotatable roller which is mounted together with the support rollers on a common shaft, and the roller support consists of one channel-shaped piece of wear-resistant plastic material having a substantially U-shaped cross-section, wherein the bearing surfaces are formed on the upper edges and adjacent the extremities of the legs of the U-shaped roller support and wherein the inclined running surface extends over a part of the length of the legs and inside the legs of the U-shaped roller support.

These features realize an embodiment of the lifting and lowering mechanism which is simple to construct and relatively cheap and which has a relatively small number of parts and a high load-supporting capacity.

With a particularly suitable embodiment of the walking beam conveyor according to the invention the support rollers are mounted axially slidably on the common shaft and may can be pushed towards the free rotatable roller against the pressure of a resilient element, and the conveyor beam and the support, respectively, have a U-shaped cross-section, the inner width of which being smaller than the axial length of the assembly of the common shaft and the support rollers in a released condition of the resilient element.

These features increase the operational reliability of the lifting and lowering mechanism considerably; due to the fact that the support rollers push against the inside of the legs of the U-shaped conveyor beam, an extra reliability is created viz., that the roller assembly with the common shaft is carried along by the conveyor beam.

The invention will be further illustrated on the basis of the drawings by a few embodiments.

Figure 2:
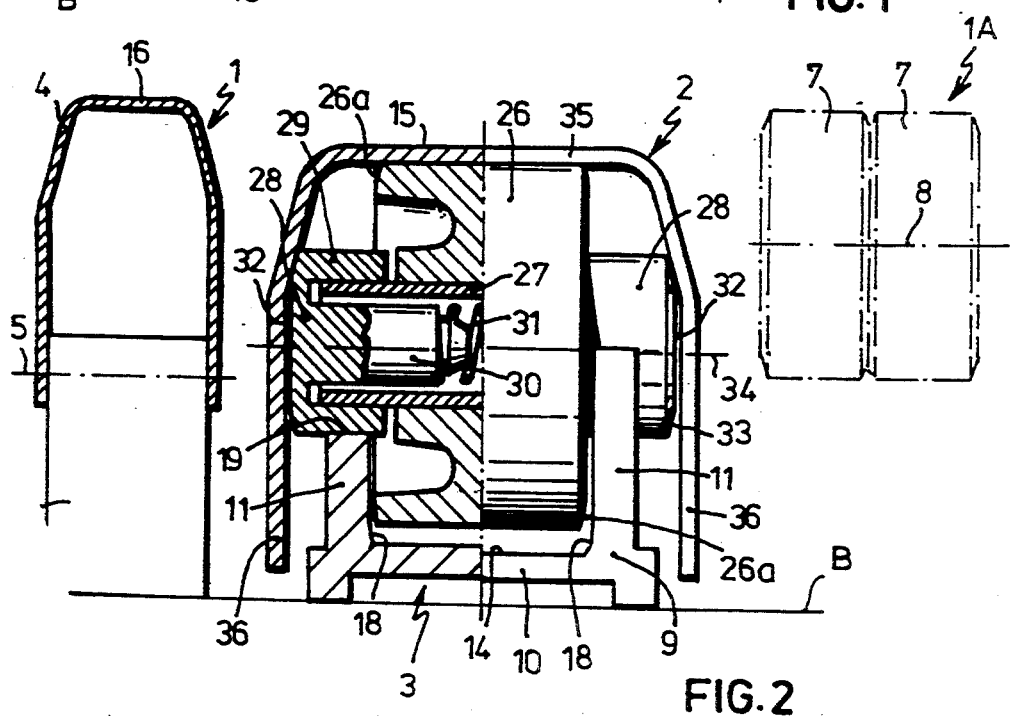
Figure 3:
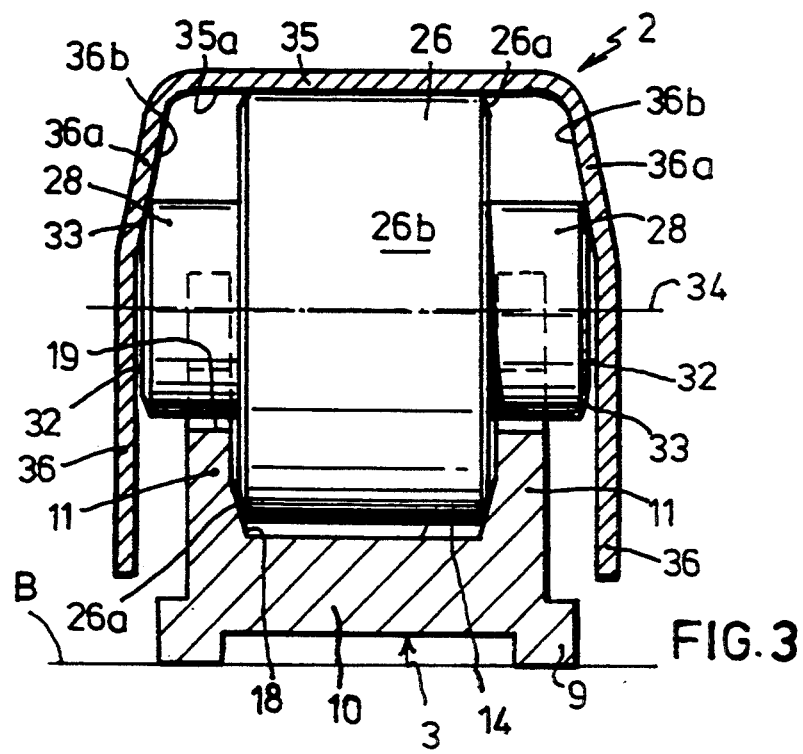
Figure 4:
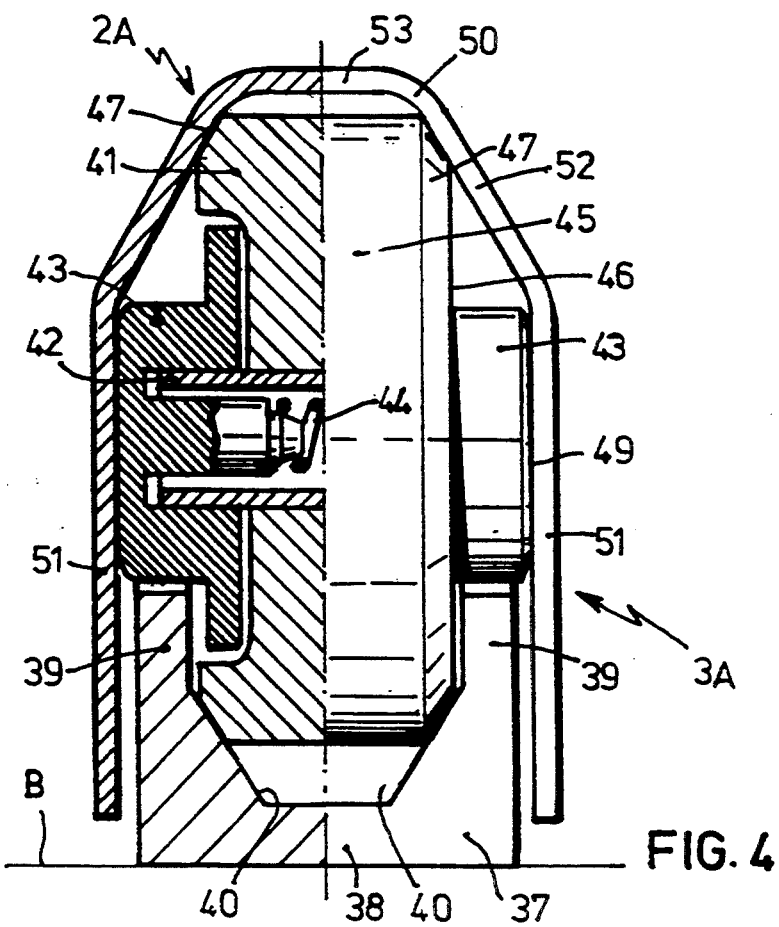
Figure 5:
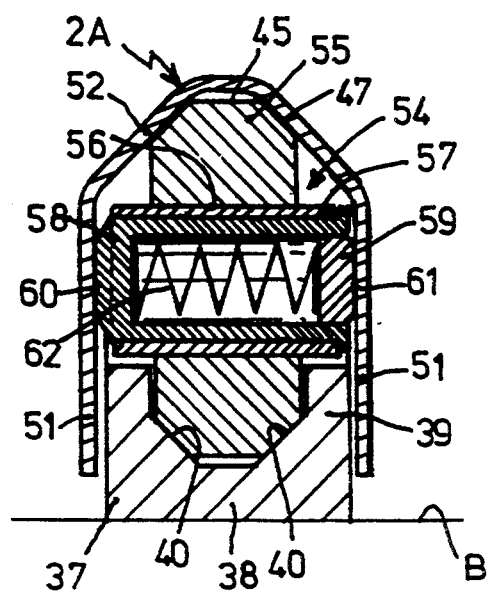
Figure 6:
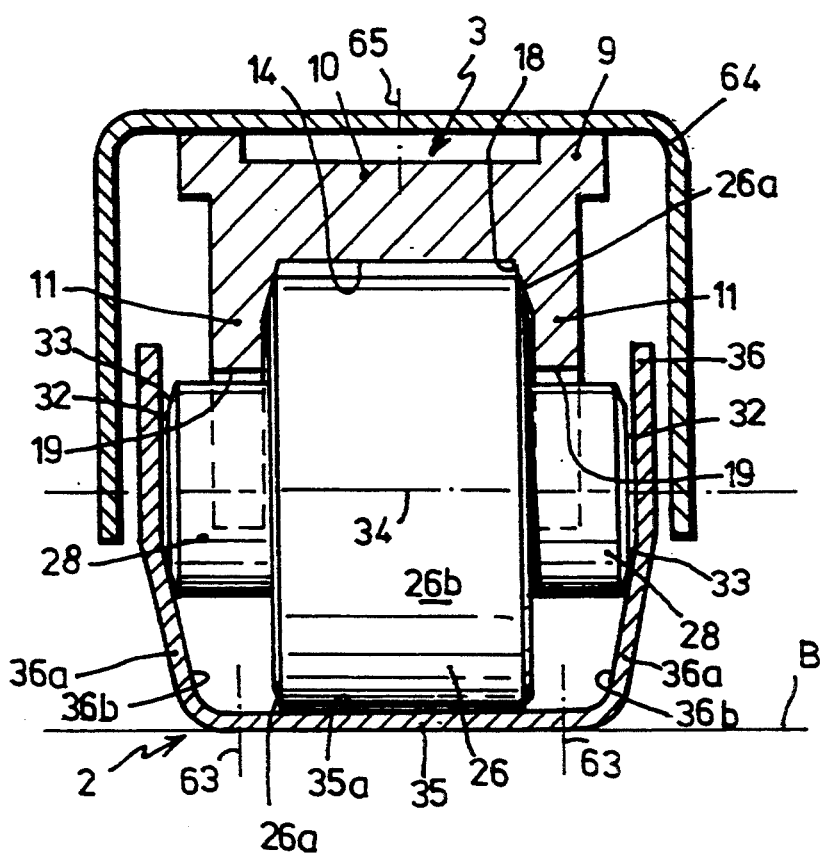

FIG. 1 shows a schematically drawn partial longitudinal section of an embodiment of the walking beam conveyor according to the invention, FIG. 2 shows a partial side view and a partial cross-section along the line II—II in FIG. 1, wherein two embodiments of a static support are drawn, FIG. 3 shows a cross-section of the walking beam conveyor along the line III—III in FIG. 2, and FIG. 4 shows another embodiment of the walking beam conveyor according to the invention in cross-section, approximately in the position of the line III—III in FIG. 1, FIG. 5 shows a cross-section corresponding to FIG. 4, wherein another embodiment of the support rollers is used, and FIG. 6 shows the walking beam conveyor according to the FIGS. 1, 2 and 3 which is rotated 180° about its longitudinal axis.

The walking beam conveyor according to the FIGS. 1 to 3 comprises a static support 1 for the objects to be conveyed, a conveyor beam 2 driven back and forth by means of a driving device, not shown, and a lifting and lowering device consisting of a plurality of separate mechanisms 3. The static support 1 for the objects to be conveyed consists of a U-shaped section 4 of for instance sheet steel which is fixed on a support beam 6 by means of bolts 5. Normally, there is also a static support 1 at the right side of the conveyor beam 2 with the embodiment according to FIG. 2, but both static supports 1A could also consist of a roller track provided with free rotatable rollers 7 which are mounted on shafts 8 and which are in turn mounted in a static support (not shown).

Each lifting and lowering mechanism 3 is provided with a roller support 9 of one piece of wear-resistant plastic material, e.g. nylon, and which has a substantially U-shaped cross-section with a bottom 10 and two legs 11. The roller support 9 may be fastened with two bolts 12 on the same base B as the static supports 1 and 1A. To this end, bores 13 may be applied. The bottom 10 of the roller support 9 has a two-piece upper surface, the left portion 14 of which enclosing an acute angle α of ±20° with the upper surface 15 of the conveyor beam and the upper surface 16 of the static support 1, respectively. The right portion 17 encloses an arbitrary acute angle with the upper surfaces 15 and 16, respectively.

The roller support 9 is provided with two inclined running surfaces 18 which substantially extend over the length of the portion 14 of the upper surface of the bottom 10 and which are formed on the inside of the lower edge of the legs 11 above the upper surface 14. The inclined running surfaces 18 extend obliquely inwardly in relation to the inner surfaces of the legs 11 and enclose an obtuse angle of approximately 100° with the upper surface of the bottom 10.

The roller support 9 is further provided with flat bearing surfaces 19 and 20 at the upper side of and adjacent the extremities of the legs 11 of the U-shaped roller support 9, which bearing surfaces 19 and 20 are substantially parallel to the moving direction of the conveyor beam. The bearing surfaces 19 and 20 are closed by a stop 21 and 22, respectively, at the free ends of the legs 11, the stop surface 23 and 24, respectively, of which is an arc of a circle. The inner ends of the bearing surfaces 19 and 20 may be connected by a flat surface 25.

Each lifting and lowering mechanism is furthermore provided with a free rotatable roller 26 on a hollow shaft 27, which has support members mounted in the form of rollers 28 on both extremities. The free rotatable roller 26 is provided with a bevelled edge 26a adjacent the outer circumference of its side surfaces, which bevelled edge encloses an obtuse angle of ±100° with the cylindrical outer surface of the free rotatable roller 26. The support rollers 28 have an outer annular portion 29, with which they are axially slidably mounted on the hollow shaft 27 and are provided with a centrally inwardly directed projection 30, between which projections a compression spring 31 is mounted. The support rollers 28 are at their flat outer surfaces 32 provided with bevelled edges 33 which enclose an acute angle of ±80° with the centreline 34 of the hollow shaft 27.

The conveyor beam 2 consists of a U-shaped section with a "bottom" 35 and "legs" 36. Adjacent the bottom 35 of the U-section the "lower" portions 36a of the legs 36 extend inwardly at an angle of ±10° and these portions are provided with an inclined surface 36b which may cooperate with the bevelled edges 33 at the support rollers. The bottom 35 rests with its inner surface 35a permanently on the cylindrical outer surface 26b of the free rotatable roller 26.

The operation of the lifting and lowering mechanism is as follows, starting from the beginning of the forward stroke H, which situation is drawn in FIG. 1.

The support rollers 28 rest on the bearing surfaces 19, the conveyor beam 2 rests with the inner surface 35a of the bottom 35 on the outer circumferential surface 26b of the free rotatable roller 26 and the objects to be conveyed (not shown) rest on the upper surface 16 of the static supports 1 or 1A.

Driving devices (not shown, but usually piston cylinder combinations) draw the conveyor beam 2 to the right in the direction of the arrow H. With that, the support rollers 28 on the bearing surfaces 19 roll to the right, by which they, and consequently also the free rotatable roller 26, are at all times carried along with the conveyor beam 2 because of the contact between the bevelled edges 33 and the inclined surfaces 36b at the inside of the legs 36 of the conveyor beam 2, so that a moment of rotation about the centerline 34 on the roller assembly 26, 28 is exerted and the roller assembly is as it were positively driven. Furthermore, the support rollers 28 are pushed with a certain force outwardly against the inside of the legs 36 of the conveyor beam 2 by the compression spring 31.

The roller assembly 26, 28 rolls on the bearing surfaces 19 to the right until the bevelled edges 26a on the roller 26 contact the inclined running surfaces 18 of the roller support 9. In this way, with the rolling motion of the free rotatable rollers 26 on the inclined running surfaces 18, an as it were positive driving force is exerted on the roller assembly 26, 28, so as to be sure that the roller assembly 26, 28 rolls upwardly along the inclined running surfaces 18 and that the conveyor beam 2 may lift the objects to be conveyed from the static supports 1 or 1A.

During the rolling motion of the free rotatable roller 26 on the inclined running surfaces 18, the outer circumference of the support rollers 28 follows a track 25a which is drawn in a dashed line in FIG. 1. The track 25a has a starting point 25b, an intermediate point 25c and an end point 25d. When the outer circumference of the support rollers 28 reaches the starting point 25b of the track 25a, the bevelled edges 26a on the roller 26 come in contact with the inclined running surfaces 18.

The lift movement of the roller assembly 26, 28 and the conveyor beam 2 with the objects is continued until the outer circumference of the support rollers 28 reaches the intermediate point 25c of the track 25a. Then the mentioned parts and the objects have reached their highest point. The inclined running surfaces 18 now fall gradually away, in such a way, that the support rollers 28 come to lie on the bearing surfaces 20 through a point 25d with a movement substantially parallel to the moving direction of the conveyor beam 2 and subsequently roll against the stops 22, 24. This position of the roller assembly 26, 28 is drawn at the right in FIG. 1 in dashed and dotted lines. The roller 26 is now freely rotatable on the shaft 27 and the conveyor beam 2 carries out its conveying stroke H.

When the conveyor beam 2 has reached the end of the conveying stroke H, driving devices (not shown) draw the conveyor beam 2 back in the direction T. By doing so, the assembly 26, 28 with the support rollers 28 first rolls back over the bearing surfaces 20 up to point 25d, after which the roller 26 comes in contact with the inclined running surfaces 18 through the intermediate point 25c, and the conveyor beam 2 moves down and drops the objects moved over the conveying stroke H on the static supports 1 or 1A. The roller assembly 26, 28 and the conveyor beam 2 move further downward, with which the roller 26 follows the inclined running surfaces 18 until the outer circumference of the support rollers has reached the point 25b and the conveyor beam has reached its lowest position. Then the support rollers 28 roll on the bearing surfaces 19 and the conveyor beam 2 drives the roller 26 with the support rollers 28 until they are against the stops 21, 23, after which the conveyor beam may continue and finish its backward stroke T. In this way the starting position according to FIG. 1 is reached again.

With the walking beam conveyor according to the invention the roller assembly 26, 28 may be constructed such, that the assembly has a fixed width, which is smaller than the inner width of the conveyor beam 2, the bevelled edges 33 at the support rollers 28 and the inclined surfaces 36b at the inside of the legs 36 of the conveyor beam 2 being omitted. The inclined running surfaces 18 at the inside of the legs 11 of the roller support 9 may also be omitted, the width of the roller 26 being smaller than the inner width of the roller support.

According to the invention with this latter embodiment of the walking beam conveyor the free rotatable roller 26 is serrated over at least a part of its cylindrical outer surface 26b and this part cooperates with the inclined running surface 14 which is serrated over at least a corresponding part of the surface.

According to the invention the conveyor beam 2 may be serrated over a corresponding part of the surface 35a cooperating with the free rotatable roller 26.

The just described embodiment of the walking beam conveyor has not been indicated in the drawings.

FIG. 4 shows an embodiment of the walking beam conveyor according to the invention, wherein the lifting and lowering mechanism 3A is provided with a roller support 37 consisting of one piece of wear-resistant plastic material, e.g. nylon. The roller support 37 has a U-shaped cross-section with a bottom 38 and two legs 39. Between the legs 39 and the bottom 38 the roller support is provided with inclined running surfaces 40, which enclose an acute angle of ±30° with the inner surface of the legs 39. The roller support 37 may further be constructed in the same or corresponding manner as the roller support 9 according to the FIGS. 1 to 3.

The lifting and lowering mechanism 3A is further provided with a free rotatable roller 41 on a hollow shaft 42 on which at its extremities support rollers 43 are mounted, between which a pretensioned compression spring 44 is mounted in the hollow shaft. The free rotatable roller 41 is at the transition of its cylindrical outer circumferential surface 45 at its side surfaces 46 provided with bevelled edges 46 at an angle of ±30° with respect to the side surfaces, which bevelled edges 47 cooperate with the inclined running surfaces 40 of the roller support 37 during the operation of the walking beam conveyor. The support rollers 43 have a flat surface 49 at the outer side.

The lifting and lowering mechanism 3A further comprises a conveyor beam 2A which consists of a longitudinal profile bar 50 having a U-shaped cross-section and which is provided with legs 51, transition parts 52 and a bottom 53. The flat outer surfaces 49 of the support rollers 43 are pushed against the inner surfaces of the legs 51 of the conveyor beam by the spring 44, the bevelled edges 47 at the free rotatable roller 45 roll over the inclined running surfaces 40 and are in contact with the inner surfaces of the transition parts 52 which are at the same angle as the bevelled edges 47. These bevelled edges 47 support the conveyor beam 2A, so that upon movement it is carried by the free rotatable rollers 41. Because of the rolling friction between the cooperating surfaces of the support rollers 43/free rotatable roller 41 and the roller support 37/conveyor beam 50 a reliable operation of the lifting and lowering mechanism 3A is at all times garanteed. The operation of the mechanism 3A is for the rest equal to that of the mechanism 3 according to the FIGS. 1 to 3.

With the embodiment according to FIG. 5 the roller support 37 and the conveyor beam 2A have the same construction and shape as the ones of the embodiment according to FIG. 4, see the description thereof.

According to FIG. 5 a roller assembly 54 is used which consists of a free rotatable roller 55 with a relatively large axial bore 56 in which a cylindrical bushing 57 is coaxially mounted. This cylindrical bushing 57 forms with its end parts, extending from the free rotatable roller 55, the support rollers 57a. In the bushing 57 a two-piece shaft 58, 59 is placed which lies with its end surfaces 61 against the inside of the legs 51 of the U-shaped conveyor beam 2A. Between the shaft parts 58 and 59 a compression spring 62 is mounted which attempts to push the parts of the shafts 58 and 59 away from each other and pushes them thereby against the inside of the legs 51 of the conveyor beam 2A.

The walking beam conveyor according to FIG. 5 operates in the same manner as the walking beam conveyor according to FIG. 4 does.

FIG. 6 shows a cross-section of the walking beam conveyor in conformity with FIG. 3 which is turned 180° about its longitudinal axis. The walking beam conveyor according to FIG. 6 is constructed in the same manner as the walking beam conveyor according to FIG. 3, with the exception that according to FIG. 6 the beam 2 functions as a support, which is fixed to the base B by means of fixing means 63, and that a reversed U-profile 64, which is connected to the roller supports 9 by fixing means functions as a conveyor beam.

The operation of the walking beam conveyor according to FIG. 6 is as follows, starting from the initial position according to FIG. 1.

The bearing surfaces 19 rest on the support rollers 28, the outer circumferential surface 26b of the free rotatable rollers 26 rests on the inner surface 35a of the bottom 35 of the support 2 and the objects to be conveyed rest on the upper surface 16 of the static supports 1 or 1A.

Driving devices (not shown, but usually piston cylinder combinations) drive the conveyor beam 64 with the roller supports 9 attached thereto during the forward stroke H. Therewith, the bearing surfaces 19 roll over the support rollers 28, with which the support rollers 28 and consequently also the free rotatable roller 26 are at all times carried along with the roller supports 9 because of the contact between the bevelled edges 33 and the inclined surfaces 36b at the inside of the legs 36 of the support 2, so that a moment of rotation is exerted on the roller assembly 26, 28 about the centreline 34 and the roller assembly being as it were positively driven. Additionally, the support rollers 28 are pushed against the inside of the legs 36 of the support 2 by the compression spring 31.

The bearing surfaces 19 roll the support rollers 28 in the direction of the forward stroke such, until the bevelled edges 26a on the free rotatable roller 26 contact the inclined running surfaces 18 of the roller support. When the free rotatable rollers 26 roll on the inclined running surfaces, an as it were positive driving force is exerted on the roller assembly 26, 28, so as to be sure that the roller assembly 26, 28 rolls upwardly along the inclined running surfaces 18 and that the conveyor beam 2 may lift the objects to be conveyed from the static supports 1 or 1A.

When the free rotatable roller 26 rolls on the inclined running surfaces 18 the outer circumference of the support rollers 28 follows a track 25a which is drawn in FIG. 1 in a dashed line. The track 25a has an initial point 25b, an intermediate point 25c and an end point 25d. When the circumference of the support rollers 28 reaches the initial point 25b of the track 25a, the bevelled edges 26a on the free rotatable roller 26 come into contact with the inclined running surfaces 18.

The lift movement of the roller assembly 26, 28 and the roller supports 9 with the conveyor beam 64, on which the objects rest, is continued until the circumference of the support rollers 28 reaches the intermediate point 25c of the track 25a. Then the mentioned parts and the objects have reached their highest point. The inclined running surfaces 18 do now gradually fall away such, that the bearing surfaces 19 in a movement substantially parallel to the moving direction of the beam 64 come to lie on the support rollers 28 and that the support rollers 28 then roll against the stops 22, 24. The free rotatable roller 26 is now freely rotatable on the shaft 27 and the beam 64 carries out its conveying stroke, during which the free rotatable roller 26 rolls with its outer circumferential surface 26b over the inner surface 35a of the bottom 35 of the support 2.

When the beam 64 has reached the end of the conveying stroke, driving devices (not shown) draw the beam 64 with the roller supports 9 back in the direction opposite to the conveying stroke. Therewith the support rollers 28 first roll over the bearing surfaces 20 back to point 25d, whereafter the free rotatable roller 26 contacts the inclined running surfaces 18 through the intermediate point 25c and the beam 64 moves downwardly and drops the objects moved over the conveying stroke onto the static supports 1 or 1A. The roller assembly 26, 28 and the beam 64 move further downwardly, the free rotatable roller 26 following the inclined running surfaces 18 until the circumference of the support rollers 28 has reached the point 25b and the beam 64 has reached its lowest position. Then the support rollers 28 come to lie on the bearing surfaces 19 and the beam 64 drives the free rotatable roller 26 with the support rollers 28 until they are against the stops 21, 23, whereafter the beam 64 may continue and finish its backward stroke, the free rotatable rollers 26 rolling again with their outer circumferential surface 26b over the inner surface 35a of the bottom 35 of the support 2. Therewith the initial position is reached again.

Although above on the basis of FIG. 6 only the walking beam conveyor according to FIGS. 1 to 3 is described in a rotated position of 180° about its longitudinal shaft, also the walking beam conveyors according to the FIGS. 4 and 5 may of course be used in a corresponding way.

I claim:

1. A walking beam conveyor comprising a static support (1) for objects to be conveyed, a back and forth drivable conveyor beam (2; 2A; 64) which is engageable with a lifting and lowering device consisting of a plurality of separate mechanisms (3; 3A), in such a way, that the conveyor beam is positioned above an upper surface (16) of the static support during forward stroke and is beneath said upper surface during backward stroke, and a support base (B) for the lifting and lowering mechanisms, wherein each lifting and lowering mechanism (3; 3A) comprises at least one free rotatable roller (26; 41) with at least one support roller, (28; 44) part (26b, 46) of an outer surface of said free rotatable roller being continuously in contact with an inner running surface of the drivable conveyor beam (35a; 52) extending in a conveying direction (H, T), a roller support (9; 37) comprising at least one inclined running surface (14, 18; 40) at an acute angle (α) relative to the support base (B, 2 and 2A respectively), said inclined running surface engageable with a part (26a; 48) of the outer surface of the free rotatable roller, and at least first and second bearing surfaces (19; 20) for the support roller (28; 44) each extending from an end of a flat surface (25), with stops being provided at outermost ends of the bearing surfaces; whereby during the forward stroke of the conveyor beam (2, 2A and 64, respectively) at first only the support roller (28; 44) contacts the first bearing surface (19), the free rotatable roller (26; 41) being free from the inclined running surface (14, 18; 40), subsequently only the free rotatable roller engages with the inclined running surface, the support roller being free from the bearing surfaces and finally only the support roller engages with the second bearing surface (20), the free rotatable roller being free from the inclined running surface, and in reverse order during the backward stroke of the conveyor beam (2, 2A and 64, respectively).

2. A walking beam conveyor according to claim 1, wherein the roller support (9; 37) is fixed on the support base (B) and that the running surface (35a; 52) extending in the conveying direction (H, T) is formed on the conveyor beam (2; 2A).

3. A walking beam conveyor according to claim 1, wherein the roller support (9; 37) is mounted on the conveyor beam (64) and the running surface (35a; 52) extending in the conveying direction (H, T) is formed on the support (2; 2A).

4. A walking beam conveyor according to claim 1, 2 or 3, wherein each lifting and lowering mechanism (3; 3A) further comprises a second support roller (28; 43), the support rollers being at both sides of the free rotatable roller (26; 41) and mounted together with the free rotatable roller on a common shaft (27; 42), the roller support (9; 37) comprising one channel-shaped piece of wear-resistant plastic material having a substantially U-shaped cross-section with at least two legs of a predetermined length, the bearing surfaces (19, 20) formed on upper edges and adjacent to the extremities of the legs (11; 39) of the U-shaped roller support, the inclined running surface (14, 18; 40) extending over a part of the predetermined length of the legs.

5. A walking beam conveyor according to claim 4, wherein the support rollers (28; 43) are mounted axially slidable on the common shaft (27; 42) and may be pushed towards the free rotatable roller (26; 41) against a pressure exerted on the support rollers by a resilient element (31, 44), the conveyor beam having a substantially U-shaped cross-section with opposing sides, a distance between said opposing sides constituting an inner width, the inner width being smaller than an axial length of an assembly comprising the common shaft (27; 42) and the support rollers (28; 43) when said resilient element is in a released condition.

6. A walking beam conveyor according to claim 5, wherein the support rollers (28) each further comprise a bevelled edge along an outer circumference of a flat outer surface of each roller, and the opposing sides of the roller support are provided with bevelled edges which correspond to and are engageable with the bevelled edges of the support rollers.

7. A walking beam conveyor according to claim 4, wherein the inclined running surface further comprises a second inclined surface (18; 40) on an inner surface of each of the legs of the substantially U-shaped roller support (9; 37), and the free rotatable roller (26; 41) further comprises a plurality of bevelled edges each along a circumference of a flat outer surface of the free rotatable roller (26a, 47), said bevelled edges being engageable with the second inclined surface.

8. A walking beam conveyor according to claim 7, wherein the conveyor beam (2; 2A) has a substantially U-shaped cross-section with two opposing sides, inner parts of the opposing sides (51) each having a bevelled shape which corresponds to and is engageable with the bevelled edge of the free rotatable roller.

9. A walking beam conveyor according to claim 1, wherein the support rollers are formed by end parts (57a) of a cylindrical bushing (57) which is mounted concentrically in the free rotatable roller (55), a hollow shaft (58, 59) comprising two pieces being mounted in the cylindrical bushing (57), a compression spring (62) being disposed between said two pieces, the conveyor beam (2A) having a substantially U-shaped cross-section comprising two opposing sides, the distance between said opposing sides being smaller than an axial length of the shaft when the compression spring is in a released condition.

10. A walking beam conveyor according to claim 1, wherein the static support (1A) for the objects to be conveyed is provided with a roller track (7).

* * * * *